(12) United States Patent
Kobayashi et al.

(10) Patent No.: US 7,569,330 B2
(45) Date of Patent: *Aug. 4, 2009

(54) METHOD FOR MANUFACTURING PATTERN OF LIGHT SHIELDING LAYER AND PATTERN FORMING BODY OF LIGHT SHIELDING LAYER

(75) Inventors: Hironori Kobayashi, Tokyo (JP); Akio Sonehara, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 2 days.

This patent is subject to a terminal disclaimer.

(21) Appl. No.: 10/414,349

(22) Filed: Apr. 15, 2003

(65) Prior Publication Data

US 2004/0027514 A1    Feb. 12, 2004

(30) Foreign Application Priority Data

Apr. 15, 2002    (JP) .............................. 2002-112461

(51) Int. Cl.
*G03F 7/00* (2006.01)
*G02F 1/1333* (2006.01)

(52) U.S. Cl. .................. 430/311; 430/315; 430/321; 430/320; 430/330; 430/324; 430/322

(58) Field of Classification Search ................ 430/7, 430/320, 321, 322, 324, 330, 302, 315
See application file for complete search history.

(56) References Cited

U.S. PATENT DOCUMENTS

| 2003/0087073 A1 * | 5/2003 | Kobayashi ............... 428/209 |
| 2004/0043334 A1 * | 3/2004 | Kobayashi et al. .......... 430/315 |

FOREIGN PATENT DOCUMENTS

JP    2000-249821    *  9/2000

* cited by examiner

*Primary Examiner*—Mark F Huff
*Assistant Examiner*—Caleen O Sullivan
(74) *Attorney, Agent, or Firm*—Ladas & Parry LLP (57) ABSTRACT

A method for manufacturing a pattern of a light shielding layer and a patter forming body of light shielding layer. After placing a photocatalyst containing layer side substrate having a base material and a photocatalyst containing layer, and a pattern forming body substrate having a substrate and a property changing layer, the property of an exposed part changes by the action of a photocatalyst in a photocatalyst containing layer, to form a wettability pattern having a lyophilic region and a liquid repellent region on the property changing layer. A light shielding layer composition is coated on the whole surface of the pattern forming body substrate on which the above-mentioned wettability pattern is formed, adhering and solidifying a light shielding layer composition only to the lyophilic region, to form a light shielding layer pattern.

6 Claims, 2 Drawing Sheets

METHOD FOR MANUFACTURING PATTERN OF LIGHT SHIELDING LAYER AND PATTERN FORMING BODY OF LIGHT SHIELDING LAYER

BACKGROUND OF THE INVENTION

1. Field of the Invention

The present invention relates to a method for manufacturing a pattern of a light shielding layer and a pattern forming body of a light shielding layer obtained by the method, more particularly, relates to a method for manufacturing a pattern of a light shielding layer, capable of manufacturing a highly sensitive and highly precise pattern of a light shielding layer and capable of manufacturing a pattern of a light shielding layer in a short period of time, and a pattern forming body of a light shielding layer.

2. Description of the Related Art

Recently, as flat displays, monochrome or color liquid crystal displays attract attention. Modes of liquid crystal displays are classified to an active matrix mode and a simple matrix mode, for controlling three primary colors and in both modes, color filters are used. Liquid crystal displays have constitution of three primary colors (R, G, B) of pixel parts, and perform color display by controlling transmission of each color of the three primary colors by electrical switching of a liquid crystal.

This color filter is constituted by forming each coloring layer, protective layer, and transparent electrode layer on a transparent substrate. To enhance a color development effect and display contrast, a pattern having a light shielding property (light shielding layer pattern, or black matrix) at interface parts between pixels of R, G and B of a coloring layer is formed. In liquid crystal displays of an active matrix mode, a thin film transistor (TFT) is used as a switching element, it is necessary to control light leakage electric current by outer light. Therefore, a high light shielding property is required for a black matrix.

Conventionally, the black matrix includes those obtained by relief formation by photo-etching of a chromium thin film formed by vapor deposition, sputtering or the like, those obtained by dyeing a hydrophilic resin relief, those obtained by relief formation using photosensitive liquid containing a black pigment dispersed, those formed by electro-depositing a black electro-deposition paint, those formed by printing, and the like.

However, though the above-mentioned black matrix obtained by relief formation by photo-etching of a chromium thin film show high dimensional precision because of use of a photo-process, a vacuum film forming process such as vapor deposition, sputtering and the like is necessary and its production process is complicated, therefore, production cost thereof is high, and further, to enhance display contrast under strong outer light, reflectance at the observed side is required to be suppressed, causing a necessity to conduct sputtering and the like of low reflection chromium requiring higher production cost. The above-mentioned method using a photosensitive resist containing a black dye and pigment dispersed previously gives low production cost, however, has a problem that a photo process tends to be insufficient since a photosensitive resist is black, consequently, when dimension precision is required, it is difficult to obtain a sufficient light shielding property, meaning that a black matrix of high quality is not obtained. Further, in the above-mentioned black matrix formation by a printing method, though it is possible to reduce production cost, a problem arises when high dimension precision is required.

On the other hand, for solving such problems, the present inventors have investigated a method for manufacturing a pattern, in which a pattern is formed by using a substance which a property is changed by the action of a photocatalyst, and the like. However, in conventional technologies, large exposing amount is necessary for changing a property, therefore, a treatment time is made longer, being an industrial problem. Further, longer treatment time is a cause for reduction in resolution.

SUMMARY OF THE INVENTION

The present invention has been made in view of the above-mentioned conditions, and an object thereof is to provide a method for manufacturing a pattern of a light shielding layer, capable of producing a highly sensitive and highly precise pattern of a light shielding layer, and capable of manufacturing a pattern of a light shielding layer in a short period of time, and to provide a pattern forming body by the same, which can be used in flat displays such as liquid crystal displays and the like, imagers such as CCD and the like, or color filters such as color sensors and the like.

To attaine the above-mentioned object, the first invention of the present invention is a method for manufacturing a pattern of a light shielding layer, comprising: a photocatalyst containing layer side substrate preparing process of preparing a photocatalyst containing layer side substrate having a base material and a photocatalyst containing layer containing a photocatalyst; a pattern forming body substrate preparing process of preparing a pattern forming body substrate having a property changing layer of which property on its surface is changed by the action of a photocatalyst in the photocatalyst containing layer; a wettability pattern forming process in which, after placing the photocatalyst containing layer and the property changing layer so as to come into contact, or after placing the photocatalyst containing layer side substrate at a distance which the action of a photocatalyst of the photocatalyst containing layer reaches the property changing layer, a wettability pattern comprising a lyophilic region and a liquid repellent region is formed on the surface of the property changing layer by irradiation with energy from predetermined direction; a light shielding layer composition coating process of adhering a light shielding layer composition only to the lyophilic region by coating the light shielding layer composition onto the whole surface of the pattern forming body substrate on which the wettability pattern is formed; and a light shielding layer pattern forming process of solidifying the light shielding layer composition adhered to the lyophilic region of the wettability pattern to obtain a pattern of a light shielding layer.

Moreover, the second invention of the present invention is a method for manufacturing a pattern of a light shielding layer, comprising: a photocatalyst containing layer side substrate preparing process of preparing a photocatalyst containing layer side substrate having a base material and a photocatalyst containing layer containing a photocatalyst; a pattern forming body substrate preparing process of preparing a pattern forming body substrate having a property changing layer of which property on its surface is changed by the action of a photocatalyst in the photocatalyst containing layer; a wettability pattern forming process in which, after placing the photocatalyst containing layer and the property changing layer so as to come into contact, or after placing the photocatalyst containing layer side substrate at a distance which the action of a photocatalyst of the photocatalyst containing layer reaches the property changing layer, a wettability pattern comprising a lyophilic region and a liquid repellent region is formed on the surface of the property changing layer by irradiation with energy from predetermined direction; and a light shielding layer pattern forming process of adhering a melting transfer film, equipped with a light shielding layer, closely to the surface of the pattern forming body substrate on which the wettability pattern is formed, then, adhering light shielding layer only to the lyophilic region by imparting energy.

In the photocatalyst containing layer side substrate described in the above mentioned first and second inventions, a primer layer is provided in between the photocatalyst containing layer and the base material.

Though the action mechanism of this primer layer is not necessarily clear, it is believed that by adopting such constitution, the primer layer has a function of preventing diffusion of impurities, particularly metal, metal-ion or the like, from the photocatalyst containing layer side substrate causing inhibition of change of a property of the property changing layer by the action of a photocatalyst, or particularly when a photomask of a Cr pattern and the photocatalyst containing layer side substrate are integrated, it has a function of preventing escaping of electric charges generated by light excitation twoard the substrate side of the photomask. Therefore, treatment of property change progresses at high sensitivity, and resultantly, a pattern of high resolution can be obtained.

The third invention of the present invention is a pattern forming body of a light shielding layer, wherein, after placing a photocatalyst containing layer side substrate having a base material and a photocatalyst containing layer containing a photocatalyst, and a pattern forming body substrate having a substrate and a property changing layer which property on its surface is changed by the action of a photocatalyst in the photocatalyst containing layer, so that the photocatalyst containing layer and the property changing layer come into contact, or after placing the photocatalyst containing layer side substrate at a distance which the action of a photocatalyst of the photocatalyst containing layer reaches the property changing layer, a wettability pattern comprising a lyophilic region and a liquid repellent region is formed on the surface of the property changing layer by irradiation with energy from predetermined direction, a light shielding layer composition is coated on the whole surface of the pattern forming body substrate on which the wettability pattern is formed, adhering and solidifying the light shielding layer composition only to the lyophilic region, to form a pattern of a light shielding layer.

The fourth invention of the present invention is a pattern forming body of a light shielding layer, wherein, after placing a photocatalyst containing layer side substrate having a base material and a photocatalyst containing layer containing a photocatalyst, and a pattern forming body substrate having a substrate and a property changing layer which property on its surface is changed by the action of a photocatalyst in the photocatalyst containing layer, so that the photocatalyst containing layer and the property changing layer come into contact, or after placing the photocatalyst containing layer side substrate at a distance which the action of a photocatalyst of the photocatalyst containing layer reaches the property changing layer, a wettability pattern comprising a lyophilic region and a liquid repellent region is formed on the surface of the property changing layer by irradiation with energy from predetermined direction, adhering a melting transfer film, equipped with a light shielding layer, closely to the surface of the pattern forming body substrate on which the wettability pattern is formed, imparting energy to adhere the light shielding layer only to the lyophilic region, to form a pattern of a light shielding layer.

In the photocatalyst containing layer side substrate described in the above mentioned third and fourth invention, a primer layer is provided in between the photocatalyst containing layer and the base material.

According to the present invention, after placing a photocatalyst containing layer side substrate having a base material and a photocatalyst containing layer, and a pattern forming body substrate having a substrate and a property changing layer of which property on its surface is changed by the action of a photocatalyst in the photocatalyst containing layer, so that the photocatalyst containing layer and the property changing layer come into contact, or after placing the photocatalyst containing layer side substrate at a distance which the action of a photocatalyst of the photocatalyst containing layer reaches the property changing layer, irradiating with energy to cause change in the property of the exposed part by the action of a photocatalyst in the photocatalyst containing layer, and a wettability pattern comprising a lyophilic region and a liquid repellent region is formed on the property changing layer. Further, a light shielding layer composition is coated on the whole surface of the pattern forming body substrate on which the wettability pattern is formed, adhering and solidifying the light shielding layer composition only to the lyophilic region, or adhering a melting transfer film, equipped with a light shielding layer, closely to the surface of the pattern forming body substrate on which the wettability pattern is formed, then imparting energy to adhere the light shielding layer only to the lyophilic region, forming a pattern of a light shielding layer. By this, a high sensitive and high precise pattern can be manufactured. Further, since the photocatalyst containing layer side substrate is removed from the pattern forming body substrate after exposure, a photocatalyst is not contained in the substrate itself on the property changing layer side, therefore, there is no fear on deterioration by time of the pattern by the action of a photocatalyst. Furthermore, a pattern having a pattern which a property is changed by exposure in a short period of time, by the effect of a primer layer can be obtained.

BRIEF DESCRIPTION OF THE DRAWINGS

FIG. 1 shows an example of a method for manufacturing a pattern of a light shielding layer of the present invention.

FIG. 2 shows another example of a method for manufacturing a pattern of a light shielding layer of the present invention.

DESCRIPTION OF THE PREFERRED EMBODIMENT

The method for manufacturing a pattern of a light shielding layer of the present invention will be illustrated using drawings. The pattern in the present invention shows various patterns such as designing, images, circuits, letters and the like and is not particularly limited.

FIG. 1 shows as example of a method for manufacturing a pattern of a light shielding layer of the present invention. In this manufacturing method, first, a photocatalyst containing layer side substrate 3 having a photocatalyst containing layer 2 and a base material 1, and a pattern forming body substrate 6 having a property changing layer 5 and a base material 4 are prepared (see, FIG. 1A).

Next, the surface of the photocatalyst containing layer 2 of this photocatalyst containing layer side substrate 3, and the property changing layer 5 of the pattern forming body substrate 6 are placed so that they are in close contact or are situated at a certain gap, and photo-drawing irradiated with, for example, laser and the like for. By this, the property of a part irradiated with light, on the property changing layer 5, changes (see, FIG. 1B).

Figure 1A:
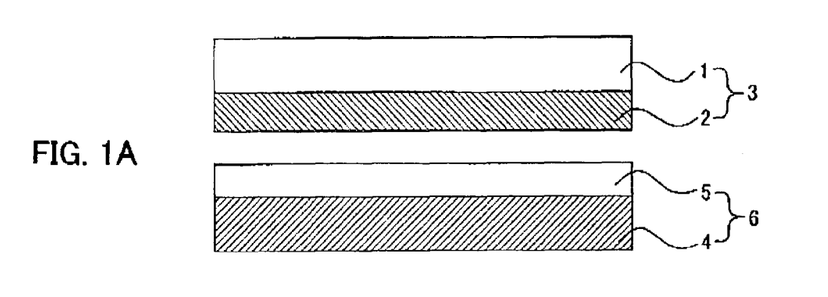
Figure 1B:
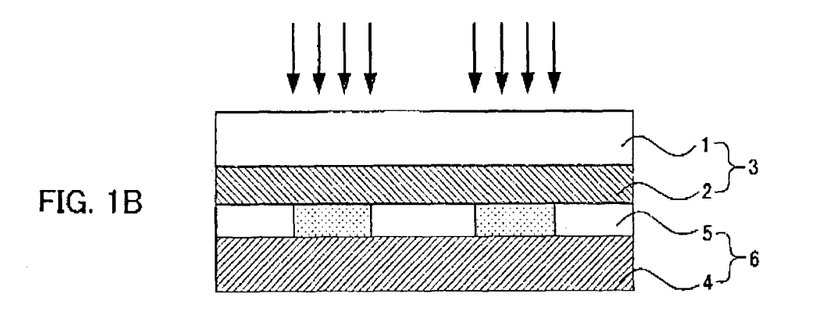

Next, by separating the photocatalyst containing layer side substrate 3 from the pattern forming body substrate 6, a pattern, which a pattern of the change of a property is drawn, is formed on the property changing layer 5.

Figure 1C:
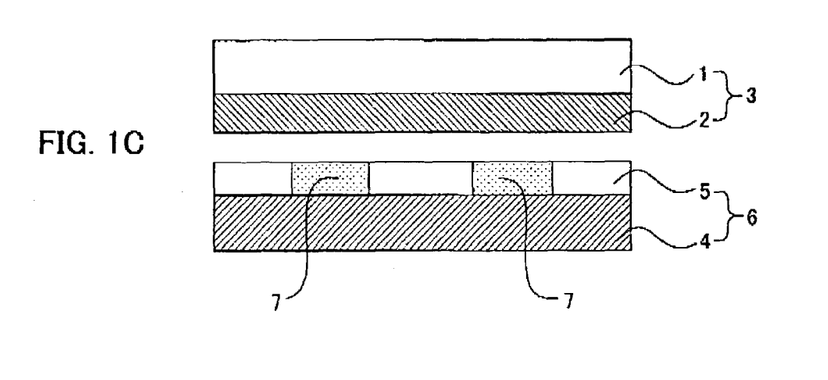

This property changing portion 7 becomes a lyophilic region, and an adjacent portion not irradiated with light shows no change of a property, and is a liquid repellent region, and a wettability pattern comprising the lyophilic region and the liquid repellent region is formed (see, FIG. 1C).

Figure 1D:
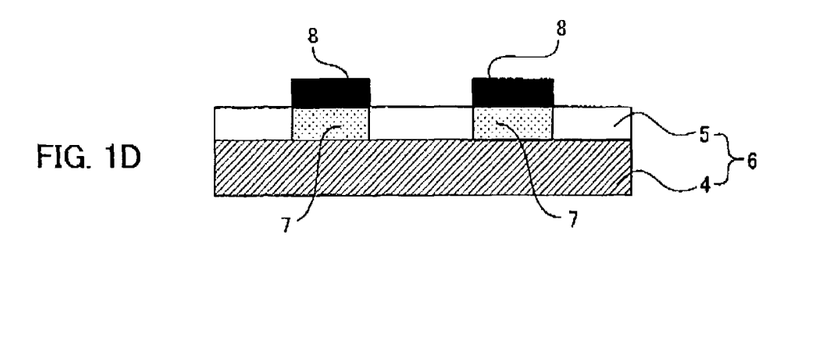

By coating a light shielding layer composition 8 on the whole surface of the pattern forming body substrate 6 on which the wettability pattern is formed, the light shielding layer composition 8 is adhered only to the lyophilic region, thereafter, the light shielding layer composition 8 adhered to the lyophilic region, of the pattern forming body substrate 6 on which the wettability pattern is formed, is solidified, or a melting transfer film equipped with a light shielding layer is adhered closely to the surface of the pattern forming body substrate on which the wettability pattern is formed, then energy is imparted to adhere the light shielding layer only to the lyophilic region, a pattern forming body of a light shielding layer is obtained (see, FIG. 1D).

Figure 2A:
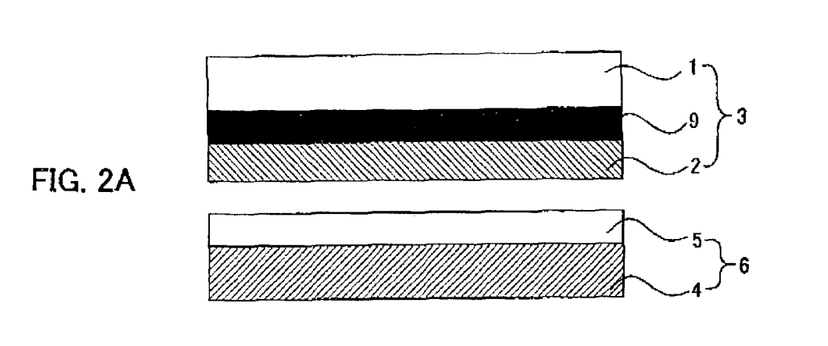

FIG. 2 shows another example of a method for manufacturing a pattern of a light shielding layer of the present invention, and in this manufacturing method, first, a photocatalyst containing layer side substrate 3 having a photocatalyst containing layer 2 via a primer layer 9 on a base material 1, and a pattern forming body substrate 6 having a property changing layer 5 and a base material 4, are prepared (see, FIG. 2A).

Next, the surface of the photocatalyst containing layer 2 of this photocatalyst containing layer side substrate 3, and the property changing layer 5 of the pattern forming body substrate 6 are placed so that they are in close contact or are situated at a certain gap, and the whole surface is exposed to, for example, UV ray and the like via a photomask 10. By this, the property of a part irradiated with light, on the property changing layer 5, changes (see, FIG. 2B).

Figure 2B:
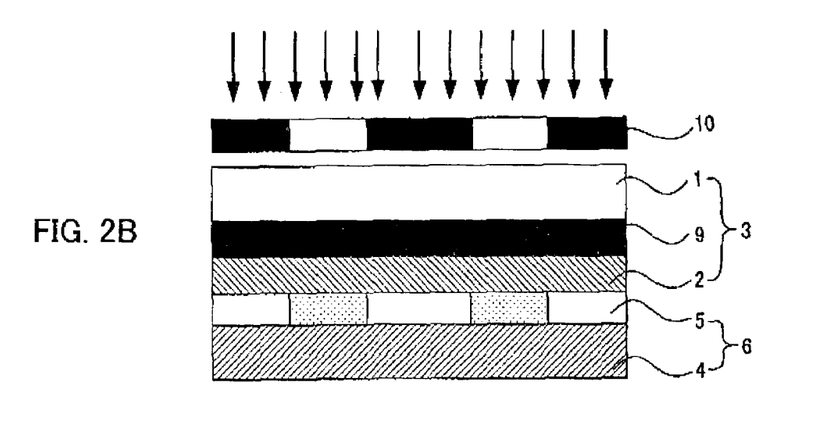

Next, by separating the photocatalyst containing layer side substrate 3 from the pattern forming body substrate 6, a pattern which a pattern of the change of a property is drawn, is formed on the property changing layer 5.

This property changing portion 7 becomes a lyophilic region, and an adjacent portion not irradiated with light shows no change of a property, and is a liquid repellent region, and a wettability pattern comprising the lyophilic region and the liquid repellent region is formed (see, FIG. 1C).

Figure 2C:
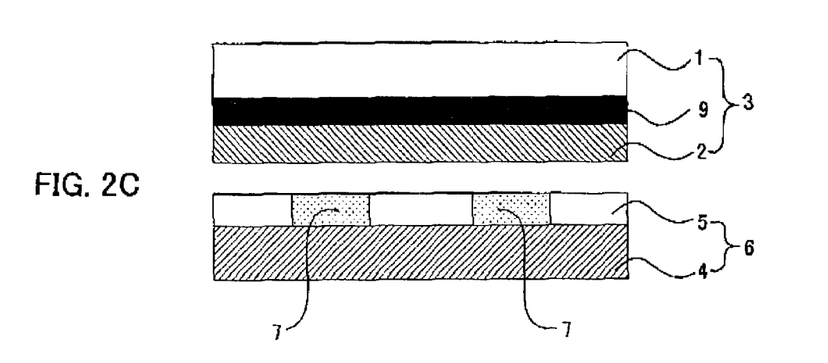
Figure 2D:
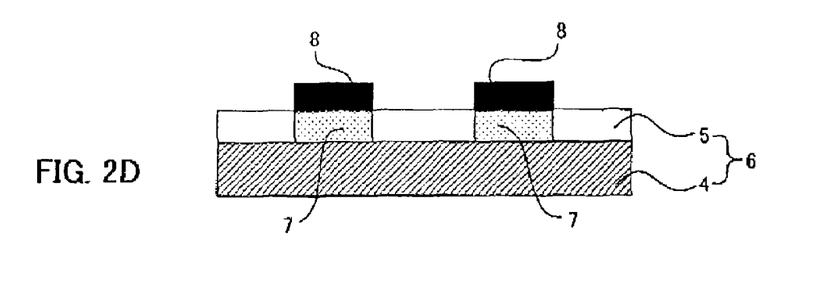

By coating a light shielding layer composition 8 on the whole surface of the pattern forming body substrate 6 on which the wettability pattern is formed, the light shielding layer composition 8 to adhered only to the lyophilic region, thereafter, the light shielding layer composition 8 adhered to the lyophilic region of the pattern forming body substrate 6, on which the wettability pattern is formed, is solidified, or a melting transfer film equipped with a light shielding layer is adhered closely to the surface of the pattern forming body substrate on which the wettability pattern is formed, then energy is imparted to adhere the light shielding layer only to the lyophilic region, a pattern forming body of a light shielding layer is obtained (see, FIG. 2D).

The method for manufacturing a pattern of a light shielding layer of the present invention will be illustrated in detail below using the above-mentioned manufacturing methods as examples.

(Base Material)

In the present invention, the photocatalyst containing layer side substrate 3 comprises the base material 1 and the photocatalyst containing layer 2 formed on this transparent substrate 1, as shown in FIG. 1. Further, as shown in FIG. 2, it is also possible that the photocatalyst containing layer side substrate 3 has a constitution in which the primer layer 9 and the photocatalyst containing layer 2 are formed in this order on the base material 1.

This base material 1 is not particularly limited as long as it is made of a material which transmits light such as UV ray and the like, for example, so that it can be exposed from the side of the photocatalyst containing layer side substrate on which the photocatalyst containing layer 2 is not formed, in exposure, as shown in FIGS. 1B and 2B. As the preferable materials, for example, transparent rigid materials having no flexibility such as quartz glass, Pyrex (trade name) glass, synthetic quartz plate and the like, or transparent flexible materials having flexibility such as transparent resin films, optical resin plates and the like, are listed.

(Photocatalyst Containing Layer)

This photocatalyst containing layer is not particularly limited as long as it has a constitution in which a photocatalyst in the photocatalyst containing layer changes a property changing layer, and may also be comprised of a photocatalyst and a binder, or formed of a photocatalyst alone.

As the photocatalyst used in the present invention, those known as photo-semiconductors, for example, titanium dioxide ($TiO_2$), zinc oxide (ZnO), tin oxide ($SnO_2$), strontium titanate ($SrTiO_3$), tungsten oxide ($WO_3$), bismuth oxide ($Bi_2O_3$) and iron oxide ($Fe_2O_3$) are listed, and one kind or two or more kinds of catalysts can be selected from them and used in admixture.

In the present invention, particularly titanium dioxide is suitably used since it has high band gap energy, is chemically stable and atoxic, and easily available. Titanium dioxide includes anatase type and rutile type, and both of them can be used in the present invention, and titanium dioxide of anatase type is preferable. Titanium dioxide of anatase type has an excitation wavelength of 380 nm or less.

As such titanium dioxide of anatase type, for example, anatase type titania sol of hydrochloric acid peptisation type (STS-02 manufactured by Ishihara Sangyo Kaisha, Ltd. (average particle size: 7 nm, ST-K01 manufactured by Ishihara Sangyo Kaisha, Ltd.), anatase type titania sol of nitric acid peptisation type (TA-15 manufactured by Nissan Chemical Industries, Ltd. (average particle size: 12 nm)), and the like are listed.

Regarding the particle size of a photocatalyst, smaller the size is, more preferable since a photocatalyst reaction occurs effectively, and the average particle size is preferably 50 nm or less, and it is particularly preferable to use a photocatalyst of 20 nm or less.

The photocatalyst containing layer in the present invention may be formed of a photocatalyst alone as described above, or may be formed of a mixture with a binder.

As the method of forming a photocatalyst containing layer made of only a photocatalyst, for example, methods using vacuum film formation methods such as a sputtering method, CVD method, vacuum vapor deposition method and the like are listed. By forming a photocatalyst containing layer by a vacuum film formation method, a photocatalyst containing layer comprising a uniform film and having only a photocatalyst can be obtained, and by this, the property on a property changing layer can be uniformly changed, and since it is made only of a photocatalyst, it is possible to change the property on a property changing layer effectively as compared with a case of using a binder.

As other examples of the method of forming a photocatalyst containing layer comprising only a photocatalyst, when the above-mentioned photocatalyst is titanium dioxide for example, a method in which amorphous titania if formed on a transparent substrate or a property changing layer, then, phase changed into crystalline titania by calcinations, and other methods are listed. The amorphous titania used here can be obtained, for example, by hydrolysis and dehydration condensation of inorganic salts of titanium such as titanium tetrachloride, titanium sulfate and the like, and by hydrolysis and dehydration condensation of organotitanium compounds in the presence of an acid such as tetraethoxytitanium, tetraisopropoxytitanium, tetra-n-propoxytitanium, tetrabutoxytitanium, tetramethoxytitanium and the like. Then, by calcinations at 400 to 500° C., it changes into anatase type titania, and by calcinations at 600 to 700° C., is changes into rutile type titania.

Though the action mechanism of a photocatalyst typified by titanium dioxide in this photocatalyst containing layer is not necessarily clear, it is believed that a carrier produced by irradiation with light causes a change in the chemical structure of an organic substance, by a direct reaction with compounds around it, or by active oxygen species produced in the presence of oxygen or water. In the present invention, it is believed that this carrier exerts an action on a compound in a property changing layer which is in contact with a photocatalyst containing layer.

When a binder is used, those having high bonding energy are preferable so that the main skeleton of a binder is no decomposed by excitation with light of the above-mentioned photocatalyst, and as such binders, for example, an organopolysiloxane and the like described in detail in the description of a property changing layer described later are listed.

When such an organopolysiloxane is used as a binder, the above-mentioned photocatalyst containing layer can be formed by dispersing a photocatalyst and organopolysiloxane as a binder, if necessary, in a solvent together with other additives, to prepare coating solution, and by coating this coating solution on a base material or a property changing layer. As the solvent used, alcohol-based organic solvents such as ethanol, isopropanol and the like are preferable. Coating can be conducted by known coating methods such as spin coat, spray coat, dip coat, roll coat, bead coat and the like. When a component of ultraviolet-curing type is contained as a binder, a photocatalyst containing layer can be formed by conducting curing treatment by irradiation with ultraviolet ray.

Further, an amorphous silica precursor can be used as the binder. This amorphous silica precursor is preferably a silicon compound of the general formula $SiX_4$, wherein X represents a halogen, methoxy group, ethoxy group, acetyl group or the like, a silanol which is a hydrolysate thereof, or polysiloxane having an average molecular weight of 3000 or less.

Specifically listed are tetraethoxysilane, tetraisopropoxysilane, tetra-n-propoxysilane, tetrabutoxysilane, tetramethoxysilane and the like. In this cane, a photocatalyst containing layer can be formed by dispersing a precursor of amorphous silica and particles of a photocatalyst uniformly in a non-aqueous solvent, forming a silanol on a base material by hydrolysis with water in air, then, performing dehydration polycondensation at normal temperature. When the dehydration polycondensation of a silanol is conducted at 100° C. or higher, the degree of polymerization of the silanol increases, and the strength of the film surface can be improved. These binding agents can be used alone or in admixture of two or more kinds.

The content of a photocatalyst in a photocatalyst containing layer can be set in a range of from 5 to 60% by weight, preferably from 20 to 40% by weight. The thickness of a photocatalyst containing layer is preferably in a range from 0.05 to 10 μm.

Further, the photocatalyst containing layer can contain a surfactant in addition to the above-mentioned photocatalysts and binders. Specifically listed are hydrocarbon-based surfactants such as NIKKOL BL, BC, BO, BB series manufactured by Nikko Chemicals Co., Ltd., fluorine-based or silicone-based nonionic surfactants such as ZONYL FSN, FSO manufactured by Dupont, Surflon S-141, 145 manufactured by Asahi Glass Co. Ltd., Megafack F-141, 144 manufactured by Dainippon Ink & Chemicals, Inc., Ftargent F-200, F251 manufactured by Neos, Unidine DS-401, 402 manufactured by Daikin Industries, Ltd., Florad FC-170, 176 manufactured by 3M Ltd, and the like, and also, cationic surfactants, anionic surfactants, and ampholytic surfactants.

Further, the photocatalyst containing layer can contain oligomers, polymers and the like such as polyvinyl alcohol, unsaturated polyester, acrylic resin, polyethylene, diallyl phthalate, ethylene propylene diene monomer, epoxy resin, phenol resin, polyurethane, melamine resin, polycarbonate, polyvinyl chloride, polyamide, polyimide, styrenebutadine rubber, chloroprene rubber, polypropylene, polybutylene, polystyrene, polyvinyl acetate, polyester, polybutadiene, polybenzimidazole, polyacrylonitrile, epichlorohydrin, polysulfide, polyisoprene and the like, in addition to the above-mentioned surfactants.

(Primer Layer)

The photocatalyst containing layer side substrate 3 can have a constitution in which the primer layer 9 and the photocatalyst containing layer 2 are formed in this order on the base material 1, and treatment of property change at high sensitivity in a pattern of a light shielding layer progresses, and resultantly, a pattern of high resolution can be obtained.

This primer layer 2 is not particularly limited in its material, and inorganic materials not easily decomposed by the action of a photocatalyst are preferable. When amorphous silica is used as a primer, the precursor of this amorphous silica is preferably a silicon compound of the general formula $SiX_4$, wherein X represents a halogen, methoxy group, ethoxy group, acetyl group or the like, a silanol which is a hydrolysate thereof, or polysiloxane having an average molecular weight of 3000 or less.

The thickness of the primer layer is preferably in a range from 0.001 μm to 1 μm, particularly preferably from 0.001 to 0.1 μm.

(Light Shielding Part)

As the photocatalyst containing layer side substrate used in the present invention, those having a light shielding part in the form of pattern may be used. By using a photocatalyst containing layer side substrate having such a light shielding part, it is not necessary to use a photomask in exposure or to conduct drawing irradiation with laser light. Therefore, since positioning of a photocatalyst containing layer side substrate and a photomask is not necessary, it is possible to provide a simple process, and further, an expensive apparatus necessary for drawing irradiation is also not necessary, an advantage in cost is obtained.

The photocatalyst containing layer side substrate having such a light shielding part can have two embodiments described below depending on the formation position of a light shielding part.

One is, for example, an embodiment in which a light shielding part is formed on the above-mentioned base material, the above-mentioned photocatalyst containing layer is formed on this light shielding part, to give a photocatalyst containing layer side substrate. Another is an embodiment in which a photocatalyst containing layer is formed on the above-mentioned base material, and a light shielding part is formed thereon, to give a photocatalyst containing layer side substrate.

In either embodiment, when compared with the case using a photomask, the above-mentioned light shielding part is placed near the placing parts of the above-mentioned photocatalyst containing layer and property changing layer, therefore, an influence by diffusion of energy can be decreased, resultantly, it becomes possible to conduct pattern irradiation with energy extremely accurately.

Here, in the present invention, in the case of an embodiment in which a light shielding part is formed on the above-mentioned photocatalyst containing layer, there is a merit that, in placing the photocatalyst containing layer and the property changing layer at predetermined positions, by making the film thickness of this light shielding part the same as the width of this gap, the above-mentioned light shielding part can be used also as a spacer for making the above-mentioned gap constant.

Namely, in placing the above-mentioned photocatalyst containing layer and property changing layer in facing condition at a predetermined gap, if the above-mentioned light shielding part and property changing layer are placed in closely adhered condition, it becomes possible to make the above-mentioned predetermined gap accurate, and by conducting irradiation with energy under this condition, pasts of the property changing layer at which the property changing layer and the light shielding part are in contact manifest no change in property, and it becomes possible to form a property change pattern with good precision. In this procedure, the irradiation direction of energy is not limited to from the above-mentioned base material side, and for example, may be from the side of the base material.

The method of forming such a light shielding part is not particularly limited, and is appropriately selected and used depending on the property of the surface on which a light shielding part is formed, the shielding property against required energy required, and the like.

For example, the light shielding part may be formed by forming a thin film of a metal such as chromium and the like having a thickness of about 1000 to 2000 Å by a sputtering method, vapor deposition method or the like, and patterning this thin film. As this patterning method, usual patterning methods such as sputtering and the like can be used.

A method may also be permissible in which a layer is produced in the form of pattern, which contains carbon fine particles, metal oxides, inorganic pigments, organic pigments and the like of light shielding particles in a resin binder. As the resin binder, a mixture of one kind or two or more kinds of resins such as polyimide resins, acrylic resins, epoxy resins, polyacrylamide, polyvinyl alcohol, gelatin, casein, cellulose and the like, or photosensitive resins, further, resin compositions of O/W emulsion type, for example, those obtained by emulsifying a reactive silicone can be used. The thickness of such a resin light shielding part can be set in the range from 0.5 to 10 μm. As the method of patterning such a resin light shielding part, method generally used such as photolithography method, printing method and the like can be used.

In the above-mentioned description, two cases of the position of forming the above-mentioned light shielding part, between a base material and a photocatalyst containing layer and on the surface of a photocatalyst containing layer, have been described; however, an embodiment can also be adopted in which a light shielding part is formed on the surface of the side on which no photocatalyst containing layer is formed of the above-mentioned base material. In this embodiment, there is envisaged, for example, a photomask may be closely adhere to this surface to a releasable extent, and it can be suitably used when a property change pattern is changed in every small lot.

(Base Material)

In the present invention, as shown in FIG. 1 and FIG. 2, a pattern forming body substrate 6 is comprised of a base material 4 and a property changing layer 5 formed on this base material 4. As this base material 2, glass, metals such as aluminum and its alloys and the like, plastics and the like are listed depending on use purposes of a pattern forming body of a light shielding layer.

This base material is not particularly limited as long as it is conventionally used in a color filter, and for example, transparent rigid materials having no flexibility such as quartz glass, Pyrex (trade name) glass, synthetic quartz plate and the like, or transparent flexible materials having flexibility such as transparent resin films, optical resin plates and the like, can be used. Among them, particularly 7059 glass manufactured by Corning is a material having small linear expansion coefficient, excellent in dimension stability and workability in high temperature heating treatment, and non-alkali glass containing no alkali component in glass, therefore, suitable for a color filter for a color liquid crystal display or an active matrix mode. A the transparent substrate, a transparent material is usually used, however, it is also possible to use a reflective substrate and a white-colored substrate. Further, as the transparent substrate, those on which surface treatments, if necessary, for prevention of alkali elution, for imparting a gas barrier property, or for other purposes have been performed may be used.

(Property Changing Layer)

In the pattern forming body of a light shielding layer of the present invention, the property changing layer 5 is provided on the above-mentioned substrate 4. This property changing layer means a layer of which surface wettability changes by the action of a photocatalyst in exposure and by which a pattern of portions which wettability is changed can be formed. The property changing layer is not particularly limited, but its wettability changes so as to lower the contact angle with water by exposure.

By thus forming a property changing layer of which wettability changes so as to lower the contact angle with water by exposure, it is possible to easily change a wettability by conducting pattern exposure and the like, to form a pattern of a lyophilic region having small contact angle with water.

Consequently, for example, it becomes possible to form a lyophilic region easily by exposing only a part on which a functional part is formed on this property changing layer, an by adhering a light shielding part composition to this part as a functional part composition, a pattern forming body of a light shielding part can be formed easily. Therefore, a pattern forming body of a light shielding layer can be formed easily. Therefore, a pattern forming body of a light shielding layer can be manufacture efficiently, being advantageous in cost.

Here, the lyophilic region means a region showing small contact angle with water and having an excellent wettability to a light shielding layer composition. The liquid repellent region means a region showing large contact angle with water and having a poor wettability to a light shielding layer composition.

Contact angle with water of the above-mentioned property changing layer is preferably 90° or more, more preferably 140° or more at parts not exposed. The reason for this is that a part not exposed is a part for which a liquid repellency (ink repellency) is required in the present invention, therefore, when the contact angle with water is smaller than 90°, the ink repellency is not sufficient, and a possibility of remaining of a composition for light shielding layer occurs, being not preferable.

The above-mentioned property changing layer is preferably a layer of which contact angle with water lowers to 30° or less, more preferably 20° or less when exposed. The reason for the contact angle with water of an exposed part of 30° or less is that when it is over 30°, there is a possibility that spreading of the light shielding layer composition is inferior at this part, and there is a possibility of occurrence of lack in a property changing part, and the like.

The contact angle with water here is referred to a value measured by using a contact angle measuring apparatus (CA-Z type manufactured by Kyowa Interface Science Co., LTD.) 30 seconds after dropping of water drop from a micro syringe.

Further, it is desirable that a non-exposed part of the property changing layer has a critical surface tension of 50 mN/m or less, preferably 30 mN/m or less.

The material used in such as property changing layer is not particularly limited as long as it is a material with the above mentioned property of the property changing layer, namely, a material which wettability is changed by a photocatalyst in a photocatalyst containing layer in contact by exposure, and it has a main chain not easily deteriorated or decomposed by the action of a photocatalyst, and listed are, for example, (1) organopolysiloxanes causing hydrolysis and polycondensation of a chloro or alkoxysilane or the like by a sol gel reaction and the like to manifest large strength, and (2) organopolysiloxanes such as organopolysiloxanes obtained by cross-linking a reactive silicone excellent in a water repellency and oil repellency.

In the above-mentioned case (1), preferable is an organopolysiloxane, which is hydrolysis condensate or co-hydrolysis condensation of one kind or two or more kinds of silicon compounds of the general formula: $Y_nSiX_{(4-n)}$ (wherein, Y represents an alkyl group, fluoroalkyl group, vinyl group, amino group, phenyl group or epoxy group, and X represents an alkoxy group, acetyl group or halogen. n is an integer of 0 to 3.). Here, the number of carbon atoms of the group Y is preferably in the range from 1 to 20. The alkoxy group X is preferably a methoxy group, ethoxy group, propoxy group or butoxy group.

Specifically, methyltrichlorosilane, methyltribromosilane, methyltrimethoxysilane, methyltriethoxysilane, methyltriisopropoxysilane, methyltri-t-butoxysilane; ethyltrichlorosilane, ethyltribromosilane, ethyltrimethoxysilane, ethyltriethoxysilane, ethyltriisopropoxysilane, ethyltri-t-butoxysilane; n-propyltrichlorosilane, n-propyltribromosilane, n-propyltrimethoxysilane, n-propyltriethoxysilane, n-propyltriisopropoxysilane, n-propyltri-t-butoxysilane; n-hexyltrichlorosilane, n-hexyltribromosilane, n-hexyltrimethoxysilane, n-hexyltriethoxysilane, n-hexyltriisopropoxysilane, n-hexyl-t-butoxysilane; n-decyltrichlorosilane, n-decyltribromosilane, n-decyltrimethoxysilane, n-decyltriethoxysilane, n-decyltriisopropoxysilane, n-decyltri-t-butoxysilane; n-octadecyltrichlorosilane, n-octadecyltribromosilane, n-octadecyltrimethoxysilane, n-octadecyltriethoxysilane, n-octadecyltriisopropoxysilane, n-octadecyltri-t-butoxysilane; phenyltrichlorosilane, phenyltribromosilane, phenyltrimethoxysilane, phenyltriethoxysilane, phenyltriisopropoxysilane, phenyltri-t-butoxysilane; tetrachlorosilane, tetrabromosilane, tetramethoxysilane, tetraethoxysilane, tetrabutoxysilane, dimethoxydiethoxysilane; dimethyldichlorosilane, dimethyldibromosilane, dimethyldimethoxysilane, dimethyldiethoxysilane; diphenyldichlorosilane, diphenyldiboromosilane, diphenyldimethoxysilane, diphenyldiethoxysilane; phenylmethyldichlorosilane, phenylmethyldibromosilane, phenylmethyldimethoxysilane, phenylmethyldiethoxysilane; trichlorohydrosilane, tribromohydrosilane, trimethoxyhydrosilane, triethoxyhydrosilane, triisopropoxyhydrosilane, tri-t-butoxyhydrosilane; vinyltrichlorosilane, vinyltribromosilane, vinyltrimethoxysilane, vinyltriethoxysilane, vinyltriisopropoxysilane, vinyltri-t-butoxysilane; trifluoropropyltrichlorosilane, trifluoropropyltribromosilane, trifluoropropyltrimethoxysilane, trifluoropropyltriethoxysilane, trifluoropropyltriisopropoxysilane, trifluoropropyltri-t-butoxysilane; γ-glycidoxypropylmethyldimethoxysilane, γ-glycidoxypropylmethyldiethoxysilane, γ-glycidoxypropyltrimethoxysilane, γ-glycidoxypropyltriethoxysilane, γ-glycidoxypropyltriisopropoxysilane, γ-glycidoxypropyltri-t-butoxysilane; γ-methacryloxypropylmethyldimethoxysilane, γ-methacryloxypropylmethyldiethoxysilane, γ-methacryloxypropyltrimethoxysilane, γ-methacryloxypropyltriethoxysilane, γ-methacryloxypropyltriisopropoxysilane, γ-methacryloxypropyltri-t-butoxysilane; γ-aminopropylmethyldimethoxysilane, γ-aminopropylethyldiethoxysilane, γ-aminopropyltrimethoxysilane, γ-aminopropyltriethoxysilane, γ-aminopropyltriisopropoxysilane, γ-aminopropyltri-t-butoxysilane; γ-mercaptopropylmethyldimethoxysilane, γ-mercaptopropylmethyldiethoxysilane, γ-mercaptopropyltrimethoxysilane, γ-mercaptopropyltriethoxysilane, γ-mercaptopropyltriisopropoxysilane, γ-mercaptopropyltri-t-butoxysilane; β-(3,4-epoxycyclohexyl)ethyltrimethoxysilane, β-(3,4-epoxycyclohexyl)ethyltriethoxysilane, and partial hydrolysates thereof; and mixtures thereof, can be used.

Particularly, a polysiloxane containing a fluoroalkyl group can be preferably used, and specifically listed are hydrolysis condensates and co-hydrolysis condensates of one kind or two or more kinds of the following fluoroalkylsilanes, and in general, those known as a fluorine-based silane coupling agent can be used.

Represented by a chemical formula, $CF_3(CF_2)_3CH_2CH_2Si(OCH_3)_3$; $CF_3(CF_2)_5CH_2CH_2Si(OCH_3)_3$; $CF_3(CF_2)_7CH_2CH_2Si(OCH_3)_3$; $CF_3(CF_2)_9CH_2CH_2Si(OCH_3)_3$; $(CF_3)_2CF(CF_2)_4CH_2CH_2Si(OCH_3)_3$; $(CF_3)_2CF(CF_2)_6CH_2CH_2Si(OCH_3)_3$; $(CF_3)_2CF(CF_2)_9CH_2CH_2Si(OCH_3)_3$; $CF_3(C_6H_4)C_2H_4Si(OCH_3)_3$; $CF_3(CF_2)_3(C_6H_4)C_2H_4Si(OCH_3)_3$; $CF_3(CF_2)_5(C_6H_4)C_2H_4Si(OCH_3)_3$; $CF_3(CF_2)_7(C_6H_4)C_2H_4Si(OCH_3)_3$; $CF_3(CF_2)_3CH_2CH_2SiCH_3(OCH_3)_2$; $CF_3(CF_2)_5CH_2CH_2SiCH_3(OCH_3)_2$; $CF_3(CF_2)_7CH_2CH_2SiCH_3(OCH_3)_2$; $CF_3(CF_2)_9CH_2CH_2SiCH_3(OCH_3)_2$; $(CF_3)_2CF(CF_2)_4CH_2CH_2SiCH_3(OCH_3)_2$; $(CF_3)_2CF(CF_2)_6CH_2CH_2SiCH_3(OCH_3)_2$; $(CF_3)_2CF(CF_2)_4CH_2CH_2SiCH_3(OCH_3)_2$; $CF_3(C_6H_4)C_2H_4SiCH_3(OCH_3)_2$; $CF_3(CF_2)_3(C_6H_4)C_2H_4SiCH_3(OCH_3)_2$; $CF_3(CF_2)_5(C_6H_4)C_2H_4SiCH_3(OCH_3)_2$; $CF_3(CF_2)_7(C_6H_4)C_2H_4SiCH_3(OCH_3)_2$; $CF_3(CF_2)_3CH_2CH_2Si(OCH_2CH_3)_3$; $CF_3(CF_2)_5CH_2CH_2Si$:

(OCH₂CH₃)₃; CF₃(CF₂)₇CH₂CH₂Si(OCH₂CH₃)₃; CF₃(CF₂)₉CH₂CH₂Si(OCH₂CH₃)₃; and CF₃(CF₂)₇SO₂N(C₂H₅)C₂H₄CH₂Si(OCH₃)₃ and the like are listed.

By using the above-described polysiloxane containing a fluoroalkyl group as a binder, the liquid repellency (ink repellency) of a non-exposed part of a property changing layer is improved significantly, and a function to disturb adhesion of a light shielding layer composition is manifested.

As the above-mentioned reactive silicone (2), compounds having a skeleton of the following general formula are listed.

Wherein, n represents an integer of 2 or more, each of $R_1$ and $R_2$ represents a substituted or unsubstituted alkyl, alkenyl, aryl or cyanoalkyl group having 1 to 10 carbon atoms, and 40 mol % or less of the all groups are vinyl, phenyl and halogenated phenyl. Those in which $R_1$ and $R_2$ represent a methyl group are preferable since then the surface energy is the least, and it is preferable that the molar ratio of a methyl group is 60% or more. The chain end or side chain has at least one kind or two or more kinds of reactive groups such as a hydroxyl group and the like in the molecule chain.

A stable organo silicone compound causing no cross-linking reaction such as dimethylpolysiloxane may be mixed together with the above-mentioned organopolysiloxane.

The property changing layer in the present invention can further contain a surfactant. Specifically listed are hydrocarbon-based surfactants such as NIKKOL BL, BC, BO, BB series manufactured by Nikko Chemicals Co., Ltd., fluorine-based or silicone-based nonionic surfactants such as ZONYL FSN, FSO manufactured by Dupont, Surflon S-141, 145 manufactured by Asahi Glass Co. Ltd., Megafack F-141, 144 manufactured by Dainippon Ink & Chemicals, Inc., Ftargent F-200, F251 manufactured by Neos, Unidine DS-401, 402 manufactured by Daikin Industries, Ltd., Florad FC-170, 176 manufactured by 3M Ltd, and the like, and also, cationic surfactants, anionic surfactants, and ampholytic surfactants can be used.

Further, the property changing layer can contain oligomers, polymers and the like such as polyvinyl alcohol, unsaturated polyester, acrylic resin, polyethylene, diallyl phthalate, ethylene propylene diene monomer, epoxy resin, phenol resin, polyurethane, melamine resin, polycarbonate, polyvinyl chloride, polyamide, polyimide, styrenebutadine rubber, chloroprene rubber, polypropylene, polybutylene, polystyrene, polyvinyl acetate, polyester, polybutadiene, polybenzimidazole, polyacrylonitrile, epichlorohydrin, polysulfide, polyisoprene and the like, in addition to the above-mentioned surfactants.

Such a property changing layer can be formed by dispersing the above-mentioned components, if necessary together with other additives, in solvent to prepare coating solution, and coating this coating solution on a base material. As the solvent used, alcohols-based organic solvents such as ethanol, isopropanol and the like are preferable. Coating can be conducted by a known coating method such as spin coat, spray coat, dip coat, roll coat, bead coat and the like. When a component of ultraviolet-curing type is contained, a property changing layer can be formed by conducting curing treatment by irradiation with ultraviolet ray.

In the present invention, the thickness of this property changing layer is in the range preferably from 0.001 μm to 1 μm, particularly preferably from 0.01 to 0.5 μm in view of the rate of change of wettability by a photocatalyst.

In the present invention, the wettability of an exposed part can be changed, using the actions of oxidation, decomposition and the like, of additives and organic groups which are part of the above-mentioned components, to give inkphilicity (lyophilicity) to cause a large difference from the wettability of a non-exposed part, by the action of a photocatalyst in a photocatalyst containing layer in contacted, by using a property changing layer containing the above-mentioned components. Therefore, pattern forming bodies of a light shielding part (black matrix) such as color filters and the like having an excellent quality and advantageous in cost can be obtained, by enhancing receptivity (inkphilicity) and repellency (liquid repellency, ink repellency) to a light shielding part composition as a composition for a functional part.

(Light Shielding Layer Composition)

In the present invention, after placing a photocatalyst containing layer side substrate and a pattern forming body substrate so that a photocatalyst containing layer and a property changing layer come into contact, or are placed at a distance which the action of a photocatalyst of the photocatalyst containing layer reaches the property changing layer, by irradiating with energy from predetermined direction, a wettability pattern is formed on the surface of the property changing layer, and a light shielding layer composition 8 is coated on the whole surface of a pattern forming body substrate on which the wettability pattern is formed, and adhering and solidifying the light shielding layer composition 8 only to a lyophilic region, a light shielding layer pattern is formed.

The light shielding layer composition is obtained by allowing carbon fine particles, and light shielding particles of metal oxides, inorganic pigments, organic pigments and the like to be contained in a resin binder. As the resin binder, those obtained by mixing one kind or two or more kinds of resins such as polyimide resins, acrylic resins, epoxy resins, polyacrylamide, polyvinyl alcohol, gelatin, casein, cellulose and the like, and photosensitive resins, further, resin compositions of O/W emulsion type, for example, those obtained by emulsifying a reactive silicone can be used.

Coating solution obtained by dispersing or dissolving the above-described light shielding layer composition in water or solvent is prepared, and can be coated by a known coating method such as spin coat, spray coat, dip coat, roll coat, bead coat and the like. It may also be permissible that liquid obtained by dispersing or dissolving a light shielding layer composition is discharged from nozzles of an ink jet mode, to adhere the light shielding layer composition only to a lyophilic region on a pattern forming body substrate on which a wettability pattern is formed on the surface of a property changing layer.

The thickness of coating or adhesion of such as light shielding layer composition can be set in the range from 0.5 to 10 μm in dry weight.

In the present invention, a light shielding part (composition) can be adhered only to a lyophilic region by adhering a melting transfer film, equipped with a light shielding layer, closely to the surface of a pattern forming body substrate on which a wettability pattern is formed, then imparting energy.

In the melting transfer film, when at least a heat transfer ink layer is provided on a base material and energy is imparted, the heat transfer ink layer is melted and transferred only to a lyophilic region on the surface of a pattern forming body substrate on which a wettability pattern is formed, and a pattern forming body of a light shielding layer can be formed.

As methods for imparting energy to a melting transfer film, irradiation with light such as laser ray and the like, energy impartment by direct heating by a thermal head, heat roll or infrared ray, are possible. In any of the above-mentioned irradiation with light or direct heating, by imparting energy partially or totally on a melting transfer film, a light shielding layer can be adhered only to a lyophilic region, to form a light shielding layer pattern.

As the base material used in this melting transfer film, the same base material as used in conventional beat transfer recording materials can be used as it is, and other materials can also be used, without no limitation; however, when irradiation with energy such as laser ray and the like from the melting transfer film side, it is preferable to use a base material having high transparency, and particularly, it is preferable that the transmittance of the wavelength of light used is 60% or more.

Specific examples of preferable base materials include plastics having relatively good heat resistance such as polyesters such as polyethylene terephthalate and the like, polypropylene, cellophane, polycarbonate, cellulose acetate, triacetylcellulose, polyethylene, polyvinyl chloride, polystyrene, nylon, polyimide, polyvinylidene chloride, polyvinyl alcohol, fluorine resin, chlorinated rubber, ionomer and the like, papers such as condenser paper, paraffin paper and the like, non-woven fabric, and the like, and base materials obtained by combining then may also be used. The thickness of this base material can be appropriately changed depending on the material so the strength and heat conductivity are suitable, and its thickness is preferably, for example, from 2 to 180 μm.

The heat transfer ink layer in a melting transfer film can be constituted, when the melting transfer film is irradiated with light such as laser ray and the like for energy impartment, of a light shielding agent, light-heat converting agent and binder, and when a light-heat converting layer is provided in between the base material and heat transfer ink layer, the heat transfer ink layer can be comprised of a light shielding agent and binder.

The heat transfer ink layer is comprised mainly of a light shielding agent and binder resin, and by irradiation with energy, the irradiation light is converted into heat, and the bonding force with the pattern forming body substrate becomes larger than the bonding force with the melting transfer film side, thus, the heat transfer ink layer is transferred to the property changing layer side of the pattern forming body substrate. As the above-mentioned light shielding agent, light shielding particles such as carbon fine particles, metal oxides, inorganic pigments, organic pigments and the like are listed.

When energy is imparted to a melting transfer film by a thermal heat or infrared ray, the melting transfer film can be directly heated, therefore, the heat transfer ink layer needs no light-heat converting agent described above, and can be comprised of a light shielding agent and binder.

The binder of a heat transfer ink layer is preferably comprising mainly of a resin, and specifically, thermoplastic elastomers such as acrylic resins, cellulose-based resins, melamine-based resins, polyester-based resins, polyamide-based resins, polyolefin-based resins, acrylic resins, styrene-based resins, polyamides, ethylene-vinyl acetate copolymer, vinyl chloride-vinyl acetate copolymer, styrene-butadiene rubber and the like are listed. Particularly, those having relatively low softening point, for example, a softening point of from 50 to 150° C. conventionally used as a heat sensitive adhesive are preferable.

In addition, if necessary, a wax component can be mixed and used to an extent not disturbing heat resistance and the like. As the wax, for example, microcrystalline wax, carnauba wax, paraffin wax and the like are mentioned. Further, various waxes are listed such as Fischer-Tropech wax, various lower molecular weight polyethylenes, wood wax, bee wax, spermaceti, privet wax, wool wax, shellac wax, candelilla wax, petrolactam, polyester wax, partially degenerated wax, fatty ester, fatty amide and the like. Among them, those having a melting point of 50 to 85° C. are preferable. When it is 50° C. or lower, a problem occurs in storage stability, and when it is 85° C. or more, sensitivity is lacking in transferring.

As the light-heat converting agent, there are listed near infrared absorbing materials such as, for example, carbon black, dyes (organic compound) such as cyanine-based, polymethine-based, azulenium-based, squalirium-based, thiopyrylium-based, naphthoquinone-based, anthraquinone-based dyes and the like, organic metal complexes such as phthalocyanin-based, azo-based, thioamide-based organic metal complexes, and one kind or two or more kinds of them can be used in combination.

To form a heat transfer ink layer, a light shielding agent and binder components as described above, and if necessary, various additives such as a light-heat converting agent, dispersing agent, antistatic agent and the like, are added, further, if necessary, solvent components such as water, organic solvents and the like are compounded and adjusted to prepare heat transfer ink layer forming coating solution, and this solution is coated by conventionally known methods such as hot melt coat, hot lacquer coat, gravure direct coat, gravure reverse coat, knife coat, aero coat, roll coat and the like so that the dry thickness is from 0.05 to 5 μm.

When a light-heat converting layer is provided in a melting transfer film, the light-heat converting layer is provided on a base material, and is a layer converting laser light and the like irradiated to a melting transfer film into heat. The light-heat converting layer can comprise mainly of a binder resin and a near infrared absorbing material which is a light-heat converting material. As the light-heat converting material, there are listed, for example, carbon black, dyes (organic compound) such as cyanine-based, polymethine-based, azulenium-based, squalirium-based thiopyrylium-based, naphthoquinone-based, anthraquinone-based dyes and the like, organic metal complexes such as phthalocyanin-based, azo-based, thioamide-based organic metal complexes, and one kind or two or more kinds of them can be used in combination.

As the binder resin in the light-heat converting layer, resins having high glass transition temperature and high heat conductivity, for example, polymethyl methacrylate, polycarbonate, polystyrene, ethylcellulose, nitrocellulose, polyvinyl alcohol, polyvinyl acetal, polyvinyl butyral, polyvinyl formal, polyester, chlorinated polypropylene, chlorinated polyethylene, polyvinyl chloride, polyamide, polyimide, polyether imide, polysulfone, polyether sulfone, aramide and the like, general heat resistant resins, can be used. As the binder resin in the light-heat converting layer, water-soluble polymers can also be used. Water-soluble polymers are preferable since releasability from a heat transfer ink layer is excellent, heat resistance in irradiation with light is excellent, and so-called splashing is little against excess heating. When a water-soluble polymer is used, it is desirable that a light-heat converting substance is converted intwoater-soluble (by introduction of a sulfone group, and the like) or dispersed in an aqueous system. Further, by allowing a light-heat converting layer to contain various releasing agents, releasability between a light-heat converting layer and a heat transfer ink layer can be enhanced, and sensitivity can also be improved.

As the releasing agent, silicone-based releasing agents (polyoxyalkylene degeneration silicone oil, alcohol degeneration silicone oil and the like), fluorine-based surfactants (perfluorophosphate-based ester-based surfactant), and other various surfactants and the like are effective.

To form a light-heat converting layer, a near infrared absorbing material and binder resin as described above, and if necessary, additives, are added, further, if necessary, solvent components such as water, organic solvents and the like are compounded and adjusted to prepare light-heat converting layer forming coating solution, and this solution can be coated by conventionally known methods such as gravure direct coat, gravure reverse coat, knife coat, aero coat, roll coat and the like, and dried. The light-heat converting layer preferably has a dry film thickness of 0.1 to 3 μm.

(Photomask)

As shown in FIG. 2, the surface of a photocatalyst containing layer of the photocatalyst containing layer side substrate and the property changing layer of the pattern forming body substrate are placed so that they are in close contact or are situated at a certain gap in between, and the whole surface can be irradiated with UV and the like via a photomask 10. By this, a part irradiated with light on the property changing layer becomes a property changing part. Though FIG. 2 shows an embodiment in which a photomask and a photocatalyst containing layer side substrate are separate; however, it is not limited to this embodiment, it may also be permissible that a photomask and a photocatalyst containing layer side substrate are integrated and laminated.

The base material of a photomask is not particularly limited as long as it is a material which traits light such as, for example, UV ray and the like, so that exposure is possible from the side of a photocatalyst containing layer side substrate on which a photocatalyst containing layer is not formed, in exposure as shown in FIG. 2B. As the preferable material, listed are, for example, transparent rigid materials having no flexibility such as quartz glass, Pyrex (trade name) glass, synthetic quartz plate and the like, or transparent flexible materials having flexibility such as transparent resin films, optical resin plates and the like.

As the material for forming a light shielding layer pattern on the photomask substrate, those obtained by vapor-depositing chromium and the like, those obtained by adding a light shielding pigment to a UV-curing resin, thermosetting resin, and the like, can be used.

When the above-mentioned photomask is used, a fine pattern can be formed by using a reduction projection exposure method of reducing an image of a mask pattern by a reduction optical system. As such a photomask, there can be used those formed on a metal plate such as a vapor-deposition mask, those formed of metal chromium on a glass plate, and the like, further, plate making films and the like in a printing.

On the other hand, as shown in FIG. 1, a predetermined pattern can be drawn directly, using a predetermined drawing irradiation system by light drawing irradiation using laser ray and the like, without using a photomask.

Usually, the wavelength of light used in such exposure is set in the range of 400 nm or less, preferably 380 nm or less; however, the weight length is not limited to in such a range, and it is also possible make sensitivity to visible and other wavelengths, for example, by doping an ion of a metal such as chromium, platinum, palladium and the like, adding a fluorescent substance, adding a photosensitive dye, and the like. As such a dye, listed are cyanine dyes such as cyanine dyes, carbocyanine dyes, dicarbocyanine dyes, hemicyanine dyes and the like, and listed as other useful dyes are crystal violet, diphenylmethane dyes such as a triphenylmethane dye such as basic fuchsine, xanthene dyes such as rhodamine B, Victoria blue, brilliant green, malachite green, methylene blue, pyrylium salt, benzopyrylium salt, trimethinebenzopyrylium salt, triallylcarbonium salt and the like.

As the light source which can be used in the above-mentioned exposure, a mercury lamp, metal halide lamp, xenon lamp, excimer lamp, excimer laser, YAG laser, other various light sources are listed.

The irradiating amount of light in exposure is irradiating amount necessary for changing a property of a property changing layer by the action of a photocatalyst. In this operation, sensitivity can be increased by exposure while heating a photocatalyst containing layer. This is important particularly when using light drawing irradiation.

Here, in the present invention, the surface of a photocatalyst containing layer of the photocatalyst containing layer side substrate, and a property changing layer of the pattern forming body substrate, are placed under a condition wherein the action of a photocatalyst substantially reaches the surface of the property changing layer. This layout includes a condition in which the above-mentioned photocatalyst containing layer and property changing layer are placed at a predetermined gap, in addition to a condition wherein they are substantially physically in contact, and the above-mentioned gap is preferably 200 μm or less.

In the present invention, it is preferable that the above-mentioned gap is particularly in the range from 0.2 μm to 10 μm, preferably in the range from 1 μm to 5 μm, in view that pattern precision is extremely excellent, the sensitivity of a photocatalyst is high, and consequently, the efficiency of a change in a property of a property changing layer is excellent. Such a range of gap is particularly effective for a property changing layer of small area in which particularly a gap can be controlled at high precision.

On the other hand, when treatment is conducted on a property changing layer having a large area, for example, of 300 mm×300 mm, it is extremely difficult to form a fine gap as described above in between a photocatalyst containing layer side substrate and a property changing layer, without contacting them. Therefore, when the property changing layer has relatively large area, it is preferable that the above-mentioned gap is preferably in the range from 10 to 100 μm, particularly in the range from 50 to 75 μm. The reason for this is that, by setting the gap in this range, a problem of reduction in pattern precision such as pattern diffusion and the like and a problem of deterioration of the efficiency of a change of a property by deterioration of the sensitivity of a photocatalyst, and the like, do not occur, further, an effect arises that irregularity does not occur in the change of a property on a property changing layer.

Thus, when irradiating a property changing layer having relatively large are with energy, it is preferable that the gap of an apparatus of determining positions of a photocatalyst containing layer side substrate and a property changing layer in an energy irradiation apparatus is set in the range from 10 μm to 200 μm, particularly in the range from 25 μm to 75 μm. The reason for this is that, by setting in ouch a range, placing is possible without causing significant reduction in pattern precision and significant deterioration of the sensitivity of a photocatalyst, and without contacting a photocatalyst containing layer side substrate and a property changing layer.

Thus by placing a photocatalyst containing layer and the surface of a property changing layer separately at a predetermined gap, it becomes easy to release active oxygen species generated by oxygen and water and the action of a photocatalyst. Namely, when the gap between a photocatalyst containing layer and a property changing layer is smaller than the above-mentioned range, it becomes difficult to release the above-mentioned active oxygen species, and a possibility occurs to resultantly delay the speed of property change, being not desirable. When they are placed at a distance larger than the above-mentioned range, generated active oxygen species cannot easily reach a property changing layer, and also in this case, a possibility occurs to delay the speed of property change, being not desirable.

As the method of forming such an extremely small gap uniformly and placing a photocatalyst containing layer and a property changing layer, there is mentioned, for example, a method of using a spacer. By using such a spacer, a uniform gap can be formed, and the action of a photocatalyst does not reach the surface of a property changing layer at a part in contact with this spacer, therefore, a predetermined property change pattern can be formed on a property changing layer by allowing this spacer to have the same pattern as the above-mentioned property change pattern. By using such a spacer, active oxygen species generated by the action of a photocatalyst are not diffused, and reach the surface of a property changing layer at high concentration, therefore, a property change pattern of high precision can be formed efficiently.

In the present invention, such placing condition of a photocatalyst containing layer side substrate need to be maintained at least only during irradiation with energy.

In FIGS. 1B and 2B, exposure is conducted from the side of a photocatalyst containing layer side substrate 3; however, direction of exposure is not limited to this in the present invention, and exposure may be conducted from the side of a pattern forming body substrate 6 if a substrate 4 and a property changing layer 5 transmit light.

By thus conducting exposure, the property changing layer 5 exposed as shown in FIGS. 1B and 2B becomes a property changing part 7 in a pattern form. This property changing part becomes a wettability changing part, by a change of a wettability of the property changing layer by exposure.

In the present invention, as shown in FIGS. 1C and 2C, after exposure is conducted, a photocatalyst containing layer side substrate 3 is removed, to obtain a pattern forming body having a pattern formed of the property changing part 7 on the property changing layer 5.

In the present invention, removal of this photocatalyst containing layer side substrate 3 becomes possible by only separating the photocatalyst containing layer side substrate 3 from the pattern forming body substrate 6 which is a pattern forming body, when, for example, the photocatalyst containing layer side substrate is simply in contact; however, when the photocatalyst containing layer side substrate 3 is in close adherence to the pattern forming body substrate 6, it is necessary, for example, to peel it off by using an sticky tape and the like.

The light shielding layer pattern formed on a pattern forming body substrate as described above has high sensitivity and high precision as a black matrix which can be used in flat displays such as liquid crystal displays and the like, imagers such as CCD and the like, color filters such as color sensors and the like, and a light shielding layer pattern can be manufactured in a short period of time.

EXAMPLES

The present invention will be further illustrated in detail by examples below.

Example 1

A photomask made of quartz glass was prepared on which a light shielding layer pattern made of chromium, having a line of 20 μm, a pitch of 100 μm and a thickness of 0.2 μm is formed.

On a quartz glass substrate of 370×470 mm, a photocatalyst inorganic coating agent ST-K03 manufactured by Ishihara Sangyo Kaisha, Ltd. was coated, then, heated at 150° C. for 20 minutes, to form a photocatalyst containing layer having a thickness of 0.15 μm, thus preparing a photocatalyst containing layer side substrate.

Next, on a glass substrate of 370×470 mm, the fluorine-based silicone coating solution prepared as described below was coated, then, heated at 120° C. for 15 minutes, to form a property changing layer having a thickness of 0.05 μm, thus preparing a pattern forming body substrate.

| <Method for preparing fluorine-based silicone coating solution> | |
|---|---|
| 0.2 normal hydrochloric acid aqueous solution | 25 g |
| Fluoroalkylsilane | 15 g |
| Tetramethoxysilane | 50 g |

These were mixed, then, stirred at 25° C. for 24 hours.

The above-mentioned photomask, photocatalyst containing layer side substrate and pattern forming body substrate were placed in this order and so that the photocatalyst containing layer and the property changing layer came into contact with each other, then, irradiated with ultraviolet ray at an illumination of 20 mW/cm$^2$ (365 nm) from the side of the photomask using a large scale automatic exposing machine MA-6000 series (manufactured by Japan Science Engineering Co., Ltd.), to form a wettability pattern on the surface of the property changing layer. At this point, the contact angle of a wettability standard reagent (40 mN/m) at an unexposed part was 75°, and it took 150 seconds until the contact angle of a wettability standard reagent (40 mN/m) at an exposed part became 9° or less.

Next, a light shielding layer composition prepared as described below was coated by a blade coater on the surface of a pattern of the property changing layer, to adhere the light shielding layer composition only to the exposed part.

<Preparation of Light Shielding Layer Composition>

A mixture of the following formulation was melted by heating at 90° C., and centrifugal separation was conducted at 12000 rpm, then, the mixture was filtrated through a glass filter of 1 μm. To the obtained aqueous coloring resin solution was added 1% by weight of ammonium dichromate as a cross-linking agent, to prepare a light shielding layer paint.

| | |
|---|---|
| Carbon black (#950, manufactured by Mitsubishi Chemical Co., Ltd.) | 4 parts by weight |
| Polyvinyl alcohol (Gosenol AH-26, manufactured by Nippon Synthetic Chemical Industry Co., Ltd.) | 0.7 parts by weight |
| Ion exchanged water | 95.3 parts by weight |

Thereafter, drying was conducted at 60° C. for 3 minutes, and the paint was exposed with a mercury lamp, to cure the light shielding part paint, further, a heating treatment at 150° C. for 30 minutes was performed to form a light shielding part.

The pattern forming body of light shielding layer in Example 1 obtained as described above had high sensitivity and high precision as a black matrix, can manufacture a light shielding layer pattern in a short period of time, and was very useful.

Example 2

On the photomask made of quartz glass on which a light shielding layer pattern made of chromium is formed having a line of 20 µm, a pitch of 100 µm and a thickness of 0.2 µm, the primer layer coating solution prepared as described below was coated, then, heated at 120° C. for 20 minutes, to form a primer layer having a thickness of 0.1 µm.

| <Method of preparing primer layer coating solution> | |
|---|---|
| 0.1 normal hydrochloric acid aqueous solution | 50 g |
| Tetramethoxysilane | 100 g |

These were mixed, then, stirred at 25° C. for 24 hours.

Next, a photocatalyst inorganic coating agent ST-K03 manufactured by Ishihara Sangyo Kaisha, Ltd. was coated on the primer layer, then, heated at 150° C. for 20 minutes, to form a photocatalyst containing layer having a thickness of 0.15 µm, completing a photomask (photocatalyst containing layer side substrate) equipped with a photocatalyst.

Next, on a glass substrate of 370×470 mm, the fluorine-based silicone coating solution prepared as described below was coated, then, heated at 120° C. for 15 minutes, to form a property changing layer having a thickness of 0.05 µm, preparing a pattern foaming body substrate.

| <Method for preparing fluorine-based silicone coating solution> | |
|---|---|
| 0.2 normal hydrochloric acid aqueous solution | 25 g |
| Fluoroalkylsilane | 15 g |
| Tetramethoxysilane | 50 g |

These were mixed, then, stirred at 25° C. for 24 hours.

The above-mentioned photomask (photocatalyst containing layer side substrate) equipped with a photocatalyst and pattern forming body substrate were placed so that the photocatalyat containing layer and the property changing layer came into contact with each other, then, irradiated with ultraviolet ray at an illumination of 20 mW/cm$^2$ (365 nm) from the side of the photomask using a large scale automatic exposing machine MA-6000 series (manufactured by Japan Science Engineering Co., Ltd.), to form a wettability pattern on the surface of the property changing layer. At this point, the contact angle of a wettability standard reagent (40 mN/m) at an unexposed part was 75°, and it took 150 seconds until the contact angle of a wettability standard reagent (40 mN/m) at an exposed part became 9° or less.

Next, a light shielding layer composition prepared as described below was coated by a blade coater on the surface of a pattern of the property changing layer, to adhere the light shielding layer composition only to the exposed part.

<Preparation of Light Shielding Layer Composition>

A mixture of the following formulation was melted by heating at 90° C., and centrifugal separation was conducted at 12000 rpm, then, the mixture was filtrated through a glass filter of 1 µm. To the obtained aqueous coloring resin solution was added 1% by weight of ammonium dichromate as a cross-linking agent, to prepare a light shielding layer paint.

| | |
|---|---|
| Carbon black (#950, manufactured by Mitsubishi Chemical Co., Ltd.) | 4 parts by weight |
| Polyvinyl alcohol (Gosenol AH-26, manufactured by Nippon Synthetic Chemical Industry Co., Ltd.) | 0.7 parts by weight |
| Ion exchanged water | 95.3 parts by weight |

Thereafter, drying was conducted at 60° C. for 3 minutes, and the light shielding part paint was exposed with a mercury lamp, to cure the light shielding part paint, further, a heating treatment at 150° C. for 30 minutes was performed to form a light shielding part.

The pattern forming body of light shielding layer in Example 2 obtained as described above had higher sensitivity and higher precision as a black matrix as compared with Example 1, can manufacture a light shielding layer pattern in a short period of time, and was very useful.

What is claimed is:

1. A method for manufacturing a pattern of a light shielding layer, comprising:
    a photocatalyst containing layer side substrate preparing process of preparing a photocatalyst containing layer side substrate having a base material and a photocatalyst containing layer containing a photocatalyst;
    a pattern forming body substrate preparing process of preparing a pattern forming body substrate having a property changing layer of which property on its surface is changed by the action of a photocatalyst in the photocatalyst containing layer;
    a wettability pattern forming process in which, after placing the photocatalyst containing layer side substrate so as to have a distance of 0.2 µm to 200 µm between the photocatalyst containing layer and the property changing layer, a wettability pattern comprising a lyophilic region and a liquid repellent region is formed on the surface of the property changing layer by irradiation with energy from predetermined direction;
    a light shielding layer composition coating process of adhering a light shielding layer composition only to the lyophilic region by coating the light shielding layer composition onto the whole surface of the pattern forming body substrate on which the wettability pattern is formed; and
    a light shielding layer forming process of solidifying the light shielding layer composition adhered to the lyophilic region of the wettability pattern to obtain a pattern of a light shielding layer.

2. The method for manufacturing a pattern of a light shielding layer according to claim 1, wherein the photocatalyst containing layer side substrate, a primer layer is provided in between the photocatalyst containing layer and the base material.

3. A method for manufacturing a pattern of a light shielding layer, comprising:
    a photocatalyst containing layer side substrate preparing process of preparing a photocatalyst containing layer side substrate having a base material and a photocatalyst containing layer containing a photocatalyst;
    a pattern forming body substrate preparing process of preparing a pattern forming body substrate having a property changing layer of which property on its surface is changed by the action of a photocatalyst in the photocatalyst containing layer;
    a wettability pattern forming process in which, after placing the photocatalyst containing layer side substrate so as to have a distance of 0.2 µm to 200 µm between the photocatalyst containing layer and the property changing layer, a wettability pattern comprising a lyophilic region and a liquid repellent region is formed on the surface of the property changing layer by irradiation with energy from predetermined direction; and
    a light shielding layer pattern forming process of adhering a melting transfer film, equipped with a light shielding layer, closely to the surface of the pattern forming body substrate on which the wettability pattern is formed, then, adhering light shielding layer only to the lyophilic region by imparting energy.

4. The method for manufacturing a pattern of a light shielding layer according to claim 3, wherein in the photocatalyst containing layer side substrate, a primer layer is provided in between the photocatalyst containing layer and the base material.

5. A method for manufacturing a pattern of a light shielding layer, comprising:
- a photocatalyst containing layer side substrate preparing process of preparing a photocatalyst containing layer side substrate having a base material and a photocatalyst containing layer containing a photocatalyst;
- a pattern forming body substrate preparing process of preparing a pattern forming body substrate having a property changing layer of which property on its surface is changed by the action of a photocatalyst in the photocatalyst containing layer;
- a wettability forming process in which, after placing the photocatalyst containing layer and the property changing layer so as to come into contact, or after placing the photocatalyst containing layer side substrate at a distance which the action of a photocatalyst of the photocatalyst containing layer reaches the property changing layer, a wettability pattern comprising a lyophillc region and a liquid repellent region is formed on the surface of the property changing layer by irradiation with energy from predetermined direction;
- a light shielding layer pattern forming process of adhering a melting transfer film, equipped with a light shielding layer, closely to the surface of the pattern forming body substrate on which the wettability pattern is formed, then, adhering light shielding layer only to the lyophilic region by irradiating with laser.

6. The method for manufacturing a pattern of a light shielding layer according to claim 5, wherein the photocatalyst containing layer side substrate, a primer layer is provided in between the photocatalyst containing layer and the base material.

* * * * *